Dec. 7, 1926.  
A. SCHMIERER  
CASTER  
Filed April 14, 1925  
1,610,166
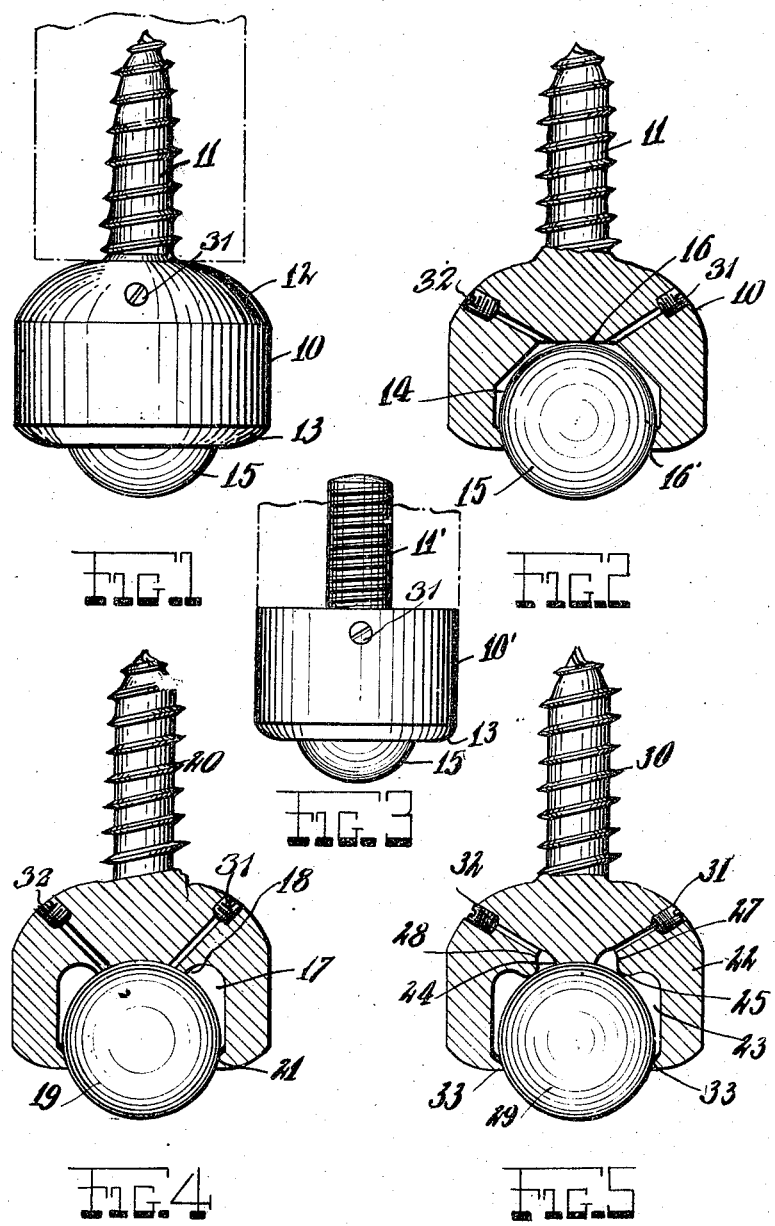
INVENTOR  
Arthur Schmierer  
BY  
ATTORNEYS.

Patented Dec. 7, 1926.

1,610,166

UNITED STATES PATENT OFFICE.

ARTHUR SCHMIERER, OF NEW YORK, N. Y.

CASTER.

Application filed April 14, 1925. Serial No. 22,930.

This invention relates to improvements in casters for furniture legs and the like, and it is the principal object of the invention to provide a caster which touches its housing at a small number of points, to which lubrication is added, thus preventing wearing out to a certain extent.

Another object of the invention is the provision of a caster allowing a rolling of its ball in any direction, and one in which the ball is held within its housing without the employment of special means for this purpose and also provided with proper lubrication.

A further object of the invention is the provision of a caster of simple and inexpensive construction which can be readily lubricated, and quickly be attached to the legs of a piece of furniture or the like.

These and other objects and advantages of my invention will become more fully known as the description thereof proceeds, and will then be specifically defined in the appended claim.

Fig. 1 is a front elevation of a caster constructed according to my invention.

Fig. 2 is a sectional elevation thereof.

Fig. 3 is a similar view to Fig. 1 showing the caster as may be applied to metal.

Fig. 4 is a sectional elevation of a modified form of my improved caster.

Fig. 5 is a sectional elevation of another modification of the caster.

The caster according to the present invention has a housing 10 equipped at its closed top with a screw 11 or the like for readily attaching the housing to the legs of a piece of furniture or the like.

The housing 10 has a dome-shaped upper part 12, and a lower bevelled edge 13. Within the housing a chamber is formed, designated 14 of a multiangular configuration, in which a ball 15 is located protruding with its lower, floor engaging face from the housing. This ball is engaging the upper wall of the chamber 14 at one theoretical point, 16 only. The ball is held by the lower edges of case 10 as at 16' which may be spun over, to grip the ball after the latter has been inserted in the chamber. Two lubricating channels are guided from the outer periphery of the housing to the chamber 14, for lubricating purposes, and suitable plugs 31, and 32 close the upper mouths of these channels.

In the modification shown in Fig. 3 the upper surface housing 10' is straight and is equipped with a metal screw 11'. In the modified form of the invention illustrated in Figure 4, the chamber 17 at its top wall has a median protuberation or boss 18 having a bowl-shaped seat at its lower end for seating part of the outer periphery of the ball 19. The fastening or holding screw in this form is designated 20, and the ball is held in the chamber by means of the lower, comparatively wide flange 21 of the housing which may be spun over, to grip the ball after the latter has been inserted in the chamber. Two lubricating channels are guided from the outer periphery of the housing to the chamber 17 for lubricating purposes, and suitable plugs 31, and 32 close the upper mouths of these channels.

In the modification illustrated in Figure 5, the casing 22 has a chamber 23 formed therein having a boss 24 formed in the top wall thereof forming a seat for the ball, and shoulders 25 are formed on the inner face of the top wall forming with said boss 24 two small chambers 27, 28. The ball is designated 29 in this form and the securing screw 30. Two lubricating channels are guided from the outer periphery of the housing to the chambers 27, 28 for lubricating purposes and suitable plugs 31, 32 close the upper mouths of these channels. As shown on the drawing these channels are obliquely directed from the outer periphery to the highest points in the chamber, so that the inserted lubricant may work its way theoretically downward due to gravity, to contact points between the ball and the chamber.

It will be clear from the above description, that in the form of the invention illustrated in Figures 1, 2, and 3, the ball touches the top wall of the housing at a theoretical single point only.

The ball 19 of the form of my invention illustrated in Figure 4 has a seat in the boss 18 and is held in place in the housing by means of the comparatively wide lower edges or margins of the same.

The ball 29 in the modification illustrated in Figure 5 is normally seated on the seat formed in the boss 24, and if this boss is worn out or down, the ball will come into engagement with the seat formed by the shoulders 25, 26. In this form the means for providing for an efficient lubrication are the plug-closed channels communicating with the chambers 27, 28, and the ball is held within its casing or cage or housing by means of the sharp-angled flanges or margins 33 which are spun into the proper positions.

It is to be understood that while I have illustrated by way of example a few of the forms in which my device may be used, other changes may be made in the construction of the same without departure from the scope of the invention as defined in the claim.

Having thus described my invention, what I claim as new and desire to secure by Letters Patent is:

The combination in a caster, of a housing with a chamber therein, a ball in said chamber, partly protruding therefrom, a seat in the top wall of said chamber, shoulders separating smaller chambers from the said chamber, means for holding said ball within said chamber, said housing being formed with a lubricating channel guided from the outer periphery to the highest point in said smaller chamber, whereby lubricant may be fed through said channel to points of contact between said ball and chamber.

In testimony whereof I have affixed my signature.

ARTHUR SCHMIERER.